US005357446A

United States Patent [19]

Maeda et al.

[11] Patent Number: 5,357,446

[45] Date of Patent: Oct. 18, 1994

[54] PUNCHING MACHINING DEVICE FOR PLATES

[75] Inventors: Akira Maeda; Kanichi Tsuchiya, both of Fujisawa, Japan

[73] Assignee: Sankyo Kogyo Co., Ltd., Fujisawa, Japan

[21] Appl. No.: 779,045

[22] Filed: Oct. 18, 1991

[30] Foreign Application Priority Data

Nov. 8, 1990 [JP] Japan .................................. 2-302892

[51] Int. Cl.5 ............................................... G06F 15/46

[52] U.S. Cl. ........................... 364/474.02; 364/474.24; 364/192

[58] Field of Search ....................... 364/474.02, 474.24, 364/476, 188–192, 193, 474.22, 474.23, 474.25, 474.26, 474.27; 234/35, 120

[56] References Cited

U.S. PATENT DOCUMENTS 5,095,419 3/1992 Seki et al. ........................ 364/474.02

5,136,521 8/1992 van Daalen et al. ........... 364/474.02

*Primary Examiner*—Jerry Smith

*Assistant Examiner*—Thomas E. Brown

*Attorney, Agent, or Firm*—Kanesaka & Takeuchi

[57] ABSTRACT

A punch machining device for a plate is formed of a vertically movable upper die including a horizontally arranged punch holder with a large number of punches for punching the plate, a stripper plate vertically movably situated under the punch holder and having holes to allow the punches to pass therethrough and a returning device for urging the stripper plate in a direction away from the punch holder, and a lower die situated under the stripper plate to form a passage for the plate to be punched between the lower die and the stripper plate. The device further includes pressing heads installed on the punch holder for the respective punches, and pressing head driving devices attached to the respective pressing heads. Each pressing head driving device operates to locate a head part of the pressing head for immovably holding the punch against the punch holder or to locate a stepped part of the pressing head for allowing the punch to slide upwardly through the punch holder to thereby selectively activate the punch for making a hole in the plate. A control device may be installed for actuating the pressing head driving device in compliance with punching pattern so that desired pattern of holes is made in the plate in the punching operation.

4 Claims, 8 Drawing Sheets

PUNCHING MACHINING DEVICE FOR PLATES

BACKGROUND OF THE INVENTION

1. Field of the Invention

This invention relates to a punching machining device for a punched plate for use in punching picture patterns or characters in a metallic plate or a plastic plate or the like to make a punched plate.

2. Description of the Prior Art

A punched plate made by punching and machining several holes in a metallic plate or a plastic plate or the like is used as construction material or a casing material for electrical equipment or the like.

As a device for making this plastic plate, it is well known in the art to provide such a system as described in Jap. Pat. Publn. No. Sho 56-1968, for example.

The punching machining device described in this publication is operated such that a rotary pressing roll having several pressing heads projected at its peripheral surface in correspondence with a pattern to be punched is rotatably mounted at a lower part of the press ram, the rotating pressing roll is pushed down by a press ram, a punching operation is carried out by a punch pressed by a pre-selected pressing head and then a punched plate is made. The rotary pressing roll is made of a plurality of disks overlapped to each other and having a pressing head projected therefrom.

However, the aforesaid prior art punching machining device has a problem of requiring a troublesome handling and time for making a new punched plate since disks constituting the rotary pressing roll must be assembled again or a new rotary pressing roll must be made again every time a pattern of punched hole to be punched in a workpiece plate is changed, and at the same time it has been difficult to make a punching of picture pattern having a certain complex figure.

In view of the foregoing, it is an object of the present invention to provide a punching machining device for a punched plate capable of resolving these problems above and freely and easily punching and machining some desired punching patterns in a workpiece plate.

It is another object of the present invention to provide a device in which an already made picture pattern can be utilized in a punching pattern as it is under a combination with an electronic control device.

It is a still another object of the present invention to provide a device in which memory of various punched hole patterns as well as their reading-out may easily be carried out under a combination with an electronic control device.

It is a still further object of the present invention to provide a device in which an editing of a punched pattern may easily be carried out under a combination with an electronic control device.

It is a yet still further object of the present invention to provide a method in which a variation of a punched hole pattern may be performed rapidly and easily under a combination with an electronic control device.

Other objects and advantages of the present invention will become more apparent in reference to the following description concerning the preferred embodiment of the present invention.

SUMMARY OF THE INVENTION

A first gist of the present invention for accomplishing the aforesaid objects resides in providing a punching machining device for a punched plate comprising an upper die of which lower surface has a punch holder having several punching punches for use in punching a workpiece plate vertically held while being passed therethrough and moved down integrally upon receiving a pressing force of a slide from above; a stripper plate arranged below the upper die, extreme ends of the punching punches projected from said punch holder being inserted in such a way as they may be pulled out or pulled back, and having a punch returning means for returning an entire upper die including the punching punches and the punch holder to their original positions when the pressing of said slide is released; a lower die mounted on a bed and having through-pass holes into which the extreme ends of said punching punches are inserted when punchings are carried out and into which punch debrises caused by said punching operation are dropped; and feeder means for transferring a workpiece to be inserted into a passage between the lower die and said stripper plate intermittently in synchronous with a punching operation of said workpiece plate, wherein said punching punches are installed in said punch holder in such a way as they may be moved up and down while top surfaces of heads are being substantially in flush with the upper surface of the punch holder, several pressing heads provided with a head surface for pressing the heads of the punching punches from above and a stepped part for releasing said pressing operation are installed on the punch holder, each of these pressing heads is provided with a pressing head driving means for changing over and driving each of said pressing heads to either the head surface or the stepped part, and the pressing head driving means is controlled by a control circuit for generating machining data binary coded in compliance with the punching pattern.

The second gist of the present invention resides in a punching machining device for a punching plate in which said control device is comprised of an original figure reading means for reading the original figure and making an image data, an editing means for editing the original figure image data outputted from the original figure reading means, and a machining data making means for arranging a hole pattern in respect to the edited image data and making machining data corresponding to the punching pattern, and said pressing head driving means is controlled in response to the machining data outputted from the machining data making means.

With such a configuration corresponding to the aforesaid first gist, when the pressing head is moved to a punching position by the pressing head driving means, the punching punch can be pressed by the pressing head when the upper die is moved down and then the workpiece plate can be punched. When the pressing head is moved to a position displaced from the punching punch position, the punching punch is not pressed by the pressing head even if the upper die is moved down, resulting in that the workpiece plate is not punched.

Accordingly, if the driving control singal based on the binary coded machining data corresponding to the punching pattern is inputted to the pressing head driving means, it is possible to make a punching plate through an optional punched pattern.

According to the configuration corresponding to the second gist of the present invention, it is possible to edit the image data of the original figure obtained by reading it through the original figure reading means with the editing means and thus it is possible to make the machining data corresponding to the punching pattern from the image data after editing operation with the machining data making means. If the machining data is inputted to the control circuit for the pressing head driving means, a workpiece plate can be punched in reference to the punching pattern made by freely laying out the original figure.

DESCRIPTION OF THE PREFERRED EMBODIMENT

Figure 1:
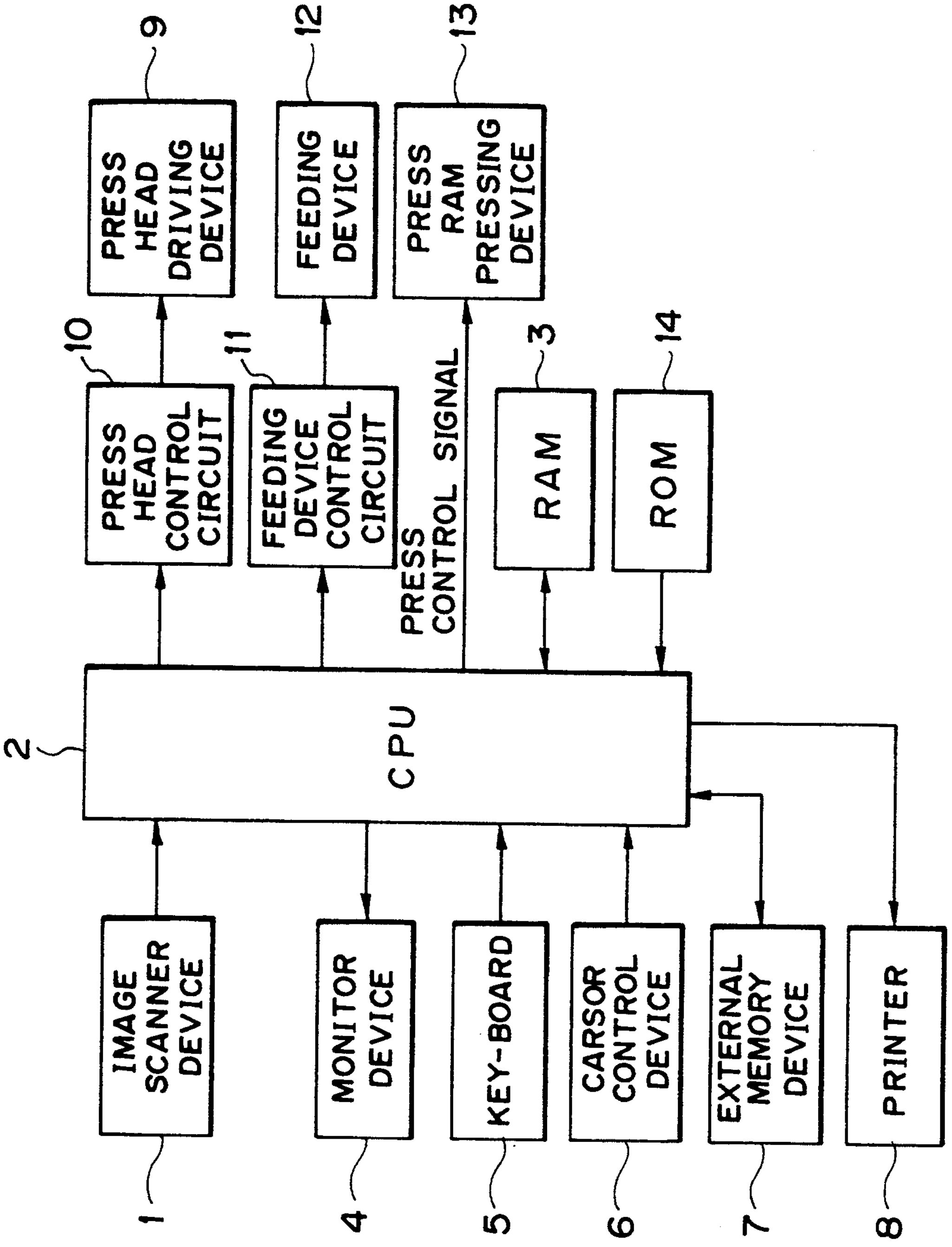
FIG. 1 is a block diagram for showing one preferred embodiment of a punching machining device for a punching plate of the present invention.

Referring now to the drawings, one preferred embodiment the present invention will be described in detail.

FIG. 1 is a block diagram for showing a punching machining device for a punched plate of the preferred embodiment of the present invention.

An image scanner device 1 acting as an original figure reading means for reading an original figure when the punched patterns are to be made is connected to CPU (a centeral processing unit) 2, and RAM (random access memory) 3 for storing image data or the like to be outputted from the image scanner device 1 is connected to CPU 2. A monitor device 4 for use in displaying on a screen of a Braun tube or the like image data or machining data taken into CPU 2 is connected to CPU 2. A key-board 5 used for inputting data or command and a so-called mouse or the like of a carsor control device 6 used for editing image data or making machining data on a screen of the monitor device 4 are connected to CPU 2. External memory device 7 such as a floppy disk for use in storing image data or machining data is connected to CPU 2, and a printer 8 for use in making a hard copy of machining data or printing a list of the machining data or the like is connected to CPU 2.

These CPU 2, monitor device 4, key-board 5, carsor control device 6, external memory device 7 or the like constitute an image data editing means and machining data making means.

To the aforesaid CPU 2 is connected a pressing head control circuit 10 for outputting a driving control signal to a pressing head driving device 9 arranged in a punching device. From a feeding device control circuit 11 connected to CPU 2 is outputted a driving control signal in respect to the feeding device 12 for intermittently feeding a workpiece plate P. In addition, from CPU 2 is outputted a pressing control signal supplied to the pressing device 13 for pressing a press ram 26 from above. In ROM (read-only-memory) 14 are stored operating programs of CPU 2.

Figure 2:
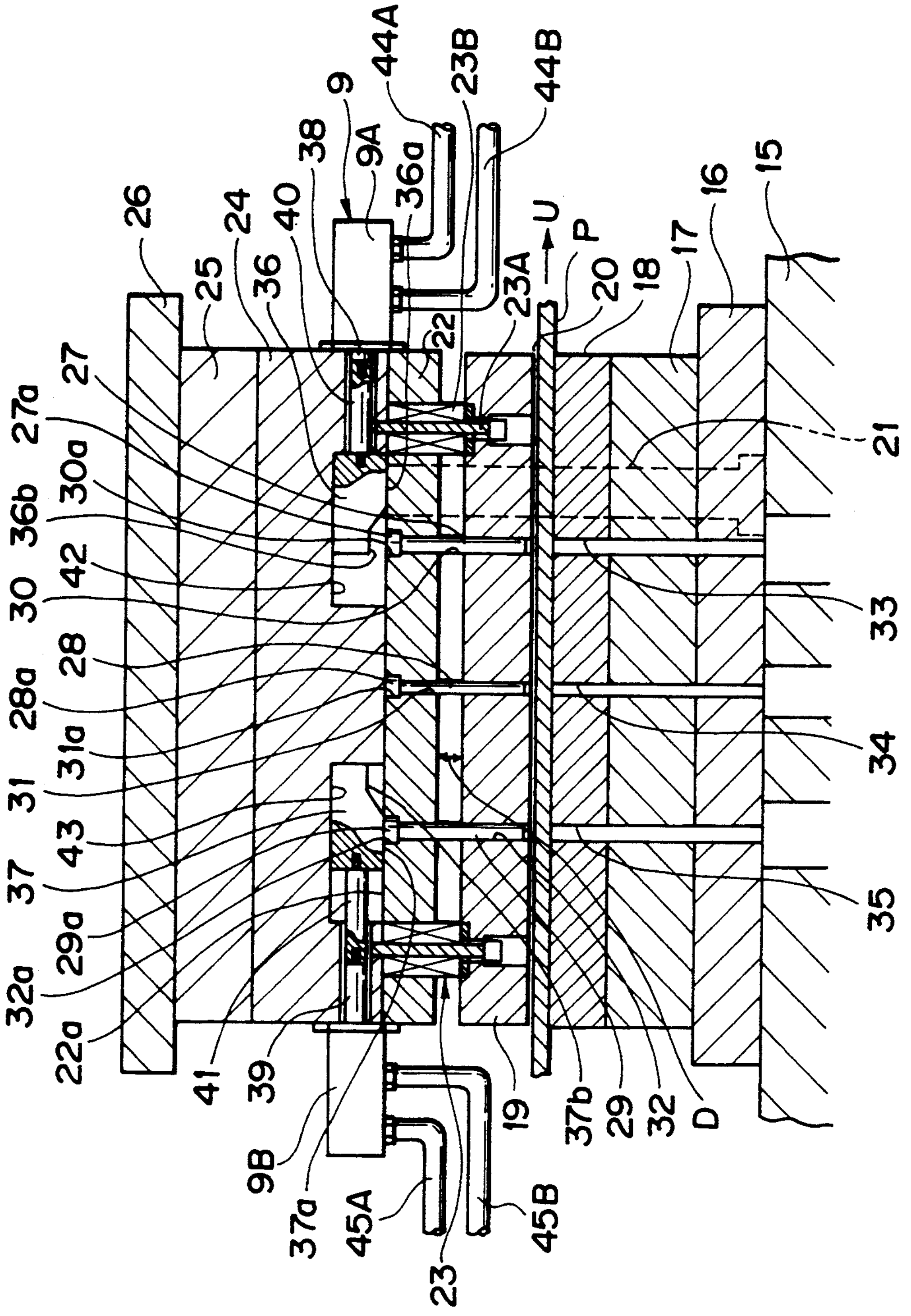
FIG. 2 is a sectional view for showing a punching mechanism of the punching machining device for a punching plate.

Then, a configuration of the punching device for use in punching the workpiece plate P of punched pattern in accordance with the machining data will be described in reference to FIG. 2.

A lower die assembly is comprised of a lower die plate 16, a spacer 17 and a die 18. This die 18 is fixed on the bed 15 through the lower die plate 16 and the spacer 17.

An upper die assembly is comprised of a punch holder 22, a cylinder holder 24, a spacer 25 and an upper die plate 26. The punch holder 22 of the upper die assembly is provided with punches to be described later and the upper die assembly is intergally moved down under an operative arrangement in which the upper die plate 26 is pressed by a pressing force applied by a slide (not shown).

The cylinder holder 24 is arranged above the punch holder 22 in the upper die assembly and the stripper plate 19 is arranged below the punch holder 22, respectively. The stripper plate 19 is threadably arranged to be moved up and down through connecting bolts 23A freely passing through the punch holder 22 and having their upper ends threadably fitted to the cylinder holder 24. Around the outer circumferences of the connecting bolts 23A are wound knock-out springs 23B for always biasing to form a wide spacing between the punch holder 22 and the stripper plate 19 so as to keep a predetermined spacing D between both elements.

The connecting bolts 23A and the knock-out springs 23B may constitute a recovery means 23 for returning the lowered upper die and the punches installed in the punch holder 22 at the upper die to their original positions when the pressing force of the slide against the upper die plate 26 is released.

Between the die 18 of the lower die and the stripper plate 19 is formed a feeding space 20 into which the workpiece plate P acting as a machining object such as a metallic plate or a plastic plate or the like is sent. To a guide pin 21 projecting to pass from above the bed 15 through the lower die plate 16, spacer 17, die 18, and stripper plate 19 is held the upper die punch holder 22 in such a way as it may be moved up and down.

On the cylinder holder 24 is fixed the upper die plate 26 through spacer 25. As the upper die is pressed from above by the press slide through the upper die plate 26, the punch holder 22 is pushed against the upper surface of the stripper plate 19 against the knock-out springs 23B. In turn, as the upper die is released from the pressing force from above caused by the press slide, the punch holder 22 is moved away from the stripper plate 19 and lifted up to its predetermined position.

Figure 3:
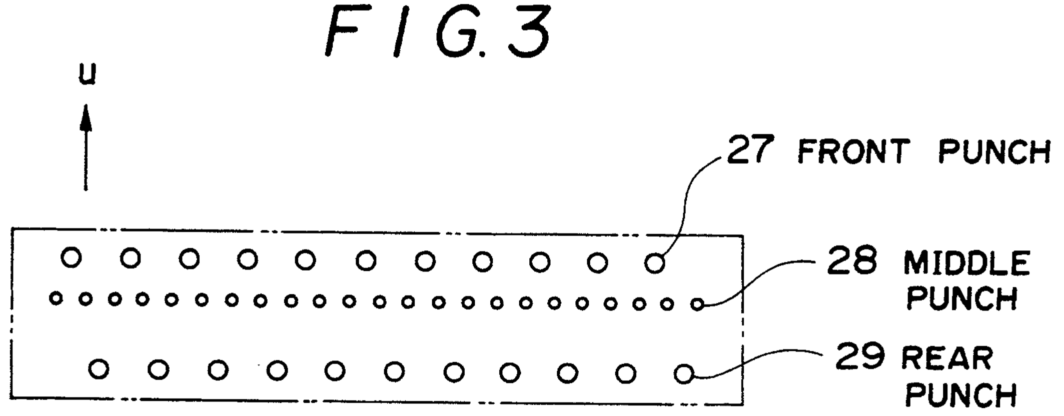
FIG. 3 is an illustrative view for showing an arrangement of a punching punch.

The punch holder 22 and the stripper plate 19 are formed with punched holes 30, 31 and 32 to which front punches 27, middle punches 28 and rear punches 29 are spaced apart along a feeding direction (u) of the workpiece plate P in such a way as they may pass through in a vertical direction. As shown in FIG. 3, these front punches 27, middle punches 28 and rear punches 29 are arranged in lateral rows in a predetermined spacing along a direction perpendicular to the feeding direction (u) of the workpiece plate P, and the punches are arranged in a zig-zag form. The middle punches 28 for uniformly punching the entire surface of the workpiece plate P have a small punching diameter, and the front punches 27 and the rear punches 29 have punching diameters of about twice as much as that of the middle punches 28. An upper end of each of these punched holes 30, 31 and 32 is formed with each of wide holes 30a, 31a and 32a to which each of the heads 27a, 28a and 29a of the punches 27, 28 and 29 is fitted. As the punch heads 27a, 28a and 29a are fitted to the wide holes 30a, 31a and 32a, the top surface of each of the heads 27a, 28a and 29a is substantially in flush with the upper surface (a holder surface 22a) of the punch holder 22. Extreme ends of the punches 27, 28 and 29 are inserted into the die 18 just below the punched holes 30, 31 and 32, and the through-pass holes 33, 34 and 35 are formed to pass through the members in the lower die through which the punch debrises drop.

The cylinder holder 24 is fixed with a pressing head driving device 9 for use in driving pressing heads 36 and 37 for operating the front punches 27 and the rear punches 29 slidable on the upper surface of the punch holder 22. The pressing head driving device 9 is comprised of a fluid cylinder of neumatic pressure or a hydraulic pressure or cylinders 9A and 9B such as electromagnetic cylinders 9A and 9B. These cylinders 9A and 9B are fixed to end surfaces across the cylinder holder 24. Each of the pressing heads 36 and 37 is fixed through the connecting rods 40 and 41 to the extreme ends of the piston rods 38 and 39 extending from each of the cylinders 9A and 9B. The pressing heads 36 and 37 are slid in the moving holes 42 and 43 arranged in the cylinder holder 24 under an extending or retracting movement of the cylinders 9A and 9B.

The pressing heads 36 and 37 are contacted with the punch holder surface 22a in such a way as the head surfaces 36a and 37a at the base ends may abut against the top surfaces of the punch heads 27a and 29a. Clearances are formed between the lower surfaces of the steps 36b, 37b at the extreme ends and the punch holder surface 22a so as to prevent them from being abutted against the top surfaces of the punch heads 27a and 29a. In case of the cylinders 9A and 9B in this preferred embodiment, as an operating neumatic pressure is added from flow passages 44A and 45A, the head surfaces 36a and 37a of the pressing heads 36 and 37 advanced under extending of the piston rods 38 and 39 are positioned over the punch heads 27a and 29a, resulting in that when the upper die plate 26 is pressed from above by the pressing device 13, the punches 27 and 29 are pressed by the pressing heads 36 and 37 and then the workpiece plate P is punched. As the operating neumatic pressure is added to the cylinders 9A and 9B from the flow passages 44A and 45B, the piston rods 38 and 39 are retracted and the stepped parts 36b and 37b of the pressing heads 36 and 37 retracted are positioned over the punch heads 27a and 29a, see that even if the upper die plate 26 is pressed, the punches 27 and 29 are not pressed and the workpiece plate P is not punched. The punch heads 28a of the middle punches 28 always abut against the lower surface of the cylinder holder 24, the punch heads 28a are pressed every time the upper die plate 26 is pressed and then the middle punches 28 punch the workpiece plate P.

The workpiece plate P arranged in the feeding spacing 20 on the die 18 is intermittently fed by the feeding device 12 every time one punching operation is carried out in synchronous with a vertical movement of the press ram 13.

Figure 4:
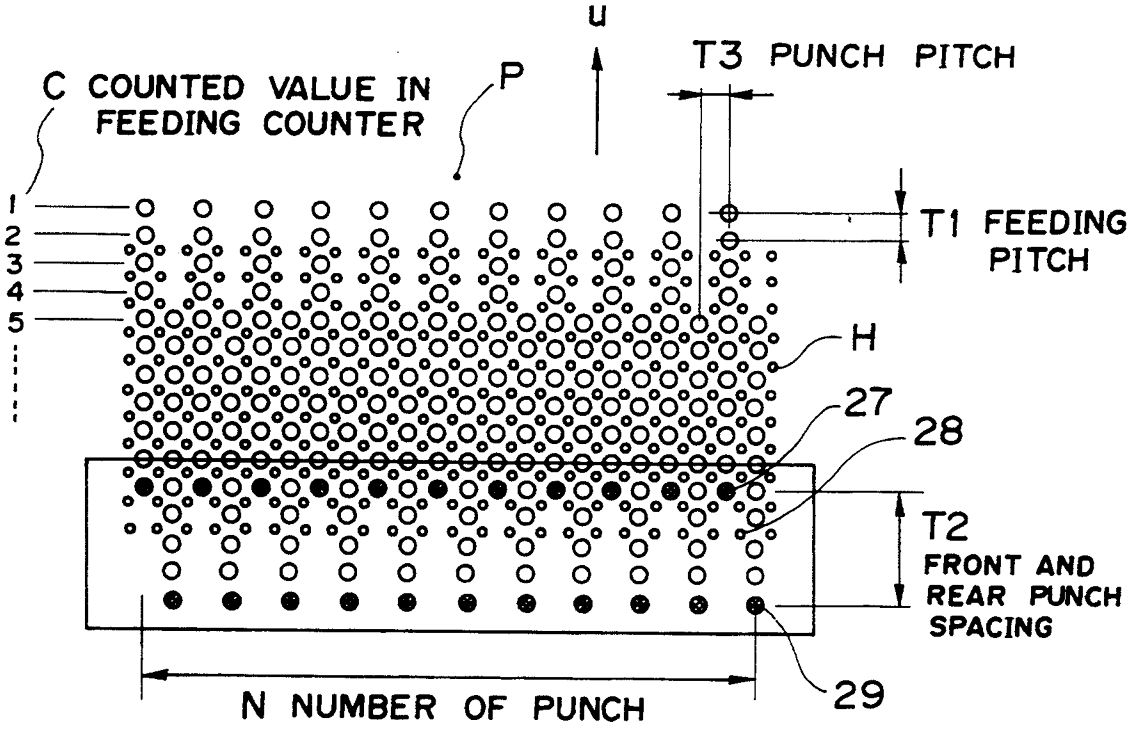
FIG. 4 is an illustrative view for showing an example of punched holes made by the punching punches.

In FIG. 4, T1 denotes a feeding pitch of the workpiece plate P, T2 a spacing between the front and rear punches, T3 a punch pitch, N the number of punches, C the counted number of the feeding counter when the workpiece plate P is fed for every punching operation, respectively.

Operation of the punching machining device for a punched plate will be described in reference to the flow charts of FIGS. 5(a) and (b).

Figure 5A:
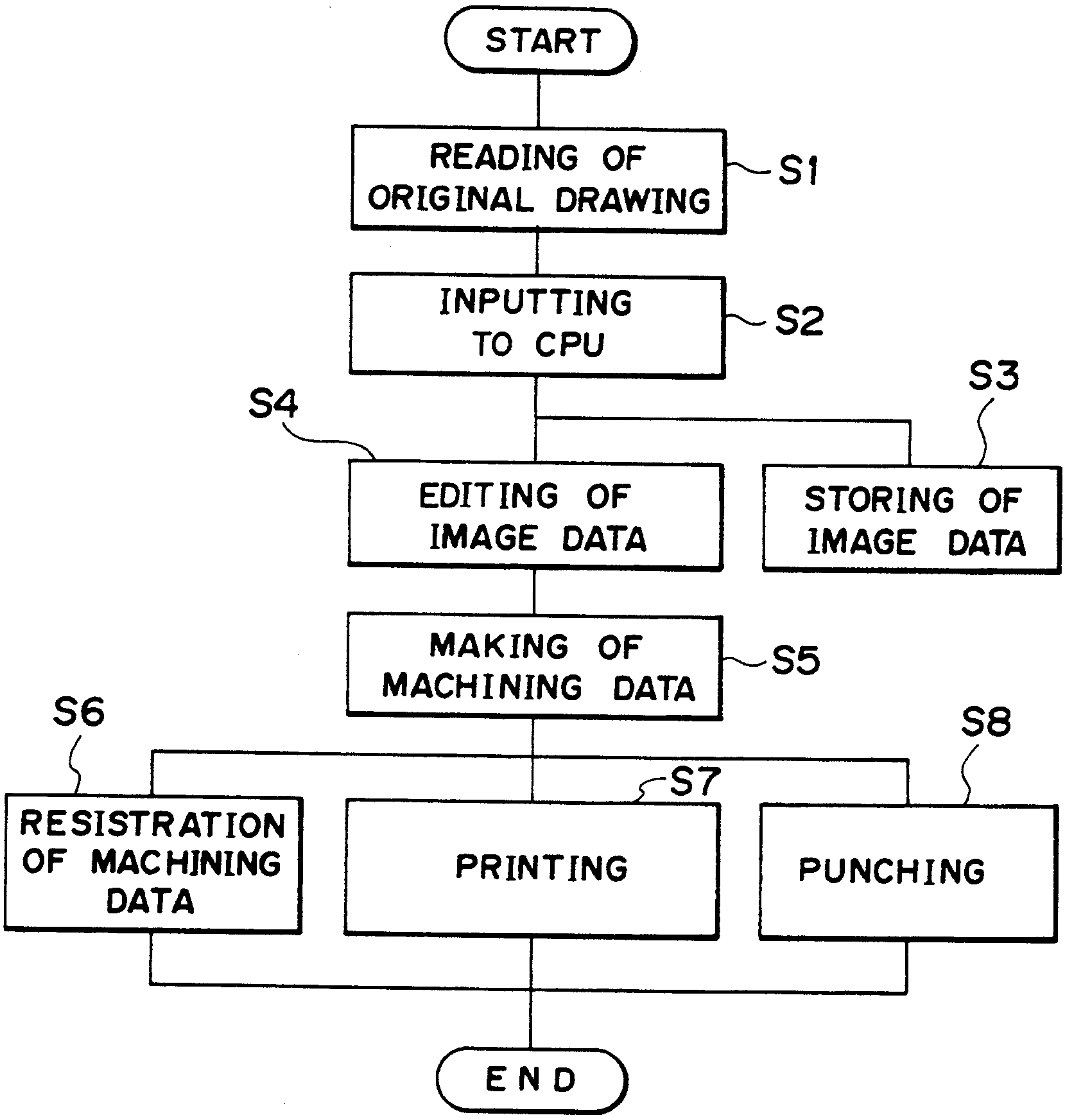
FIGS. 5(*a*) and 5(*b*) are flow charts for illustrating an operation of the punching machining device for the punched plate.
Figure 5:
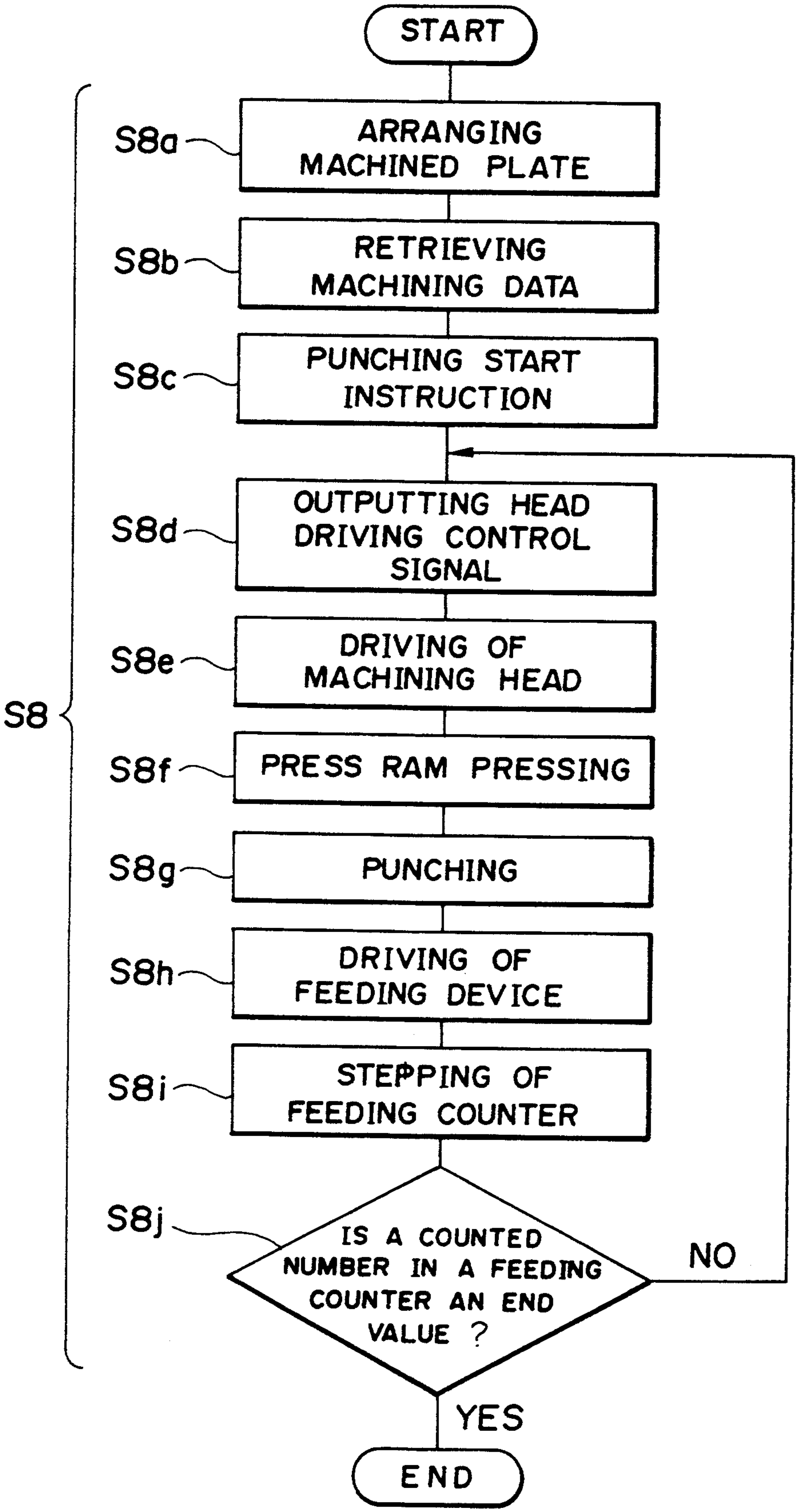

At first, as shown in FIG. 5(a), an original figure made under an optional pre-drafted design is read by the image scanner device 1 and then a binary-coded image data is made (step S1). The image data are taken into CPU 2 and stored in RAM 3 (step S2). The image data are also stored in the floppy disk of the external memory device 7 (step S3) and the data are read out as required and used.

The image data in RAM 3 are projected on the screen of the monitor device 4, an editing is carried out by the key-board 5 or the carsor control device (mouse) 6 while seeing the screen and then the image data which become the original figure for the machining pattern are made. In case of performing an editing operation, such operations as moving, copying, rotating, reversing, enlargement, reduction and deletion are also carried out (Step S4).

Subsequently, the hole patterns are arranged in respect to the image data after editing operation, a making of the machining data corresponding to the punch patterns is carried out through adding of holes and deletion of holes and occasional reversing of positive and negative (step S5). In case of making the above machining data, the machining conditions such as the spacing T2 across the front and rear punches, the number of punches N, the punch pitch T3, the feeding pitch T1 of the workpiece plate P and the punch diameter or the like are set and at the same time a pre-registered desired hole pattern is properly called up and used.

Figure 6:
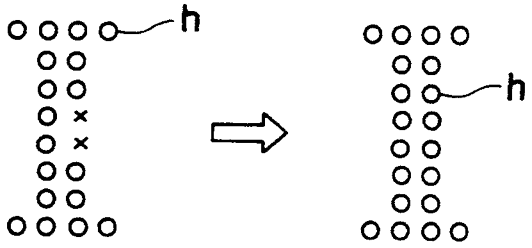
FIG. 6 is an illustrative view for illustrating an additional operation for making machining data.
Figure 7A:
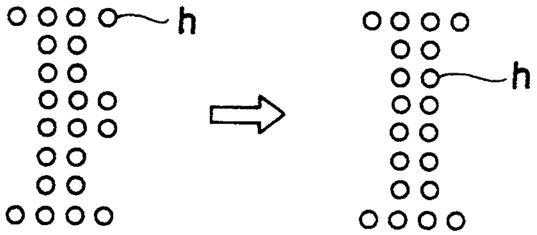
FIGS. 7(*a*) and 7(*b*) are explanatory views for illustrating a deleting operation in case of making machining data.
Figure 7B:
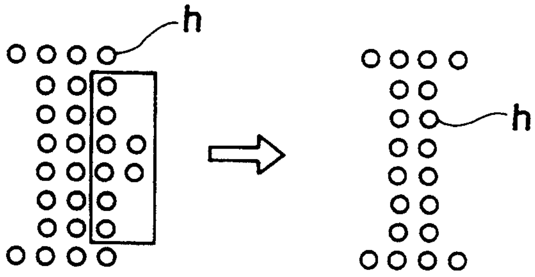
Figure 8A:
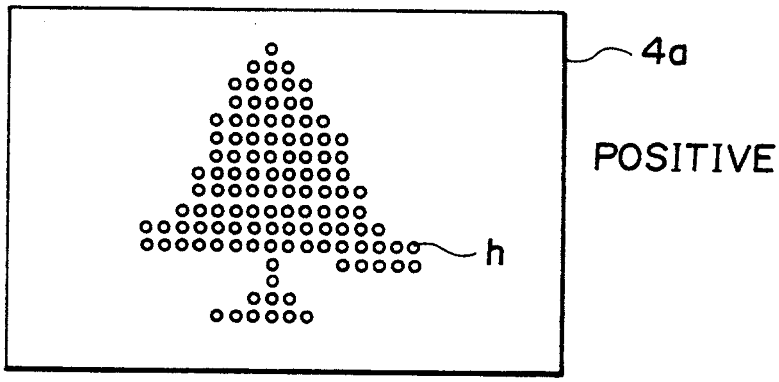
FIGS. 8(*a*) and 8(*b*) are views for illustrating a positive-negative reversing operation in case of making machining data.
Figure 8B:
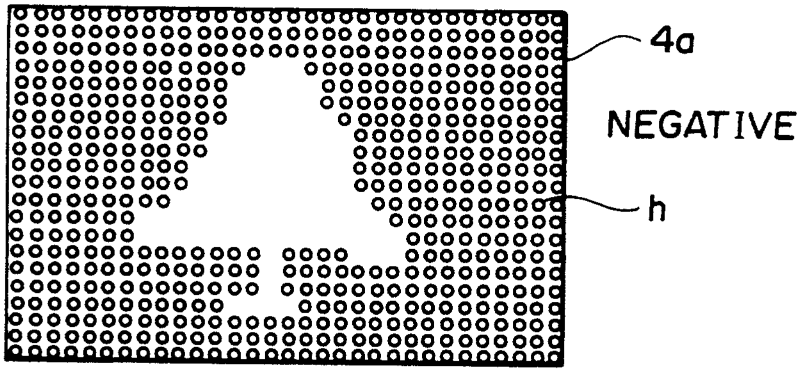
Figure 9A:
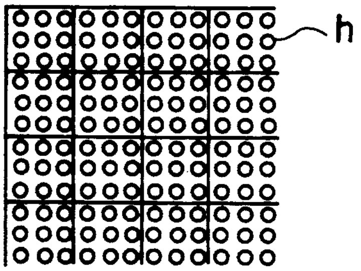
FIGS. 9(*a*) to 9(*d*) are views for illustrating examples of recorded hole patterns.
Figure 9B:
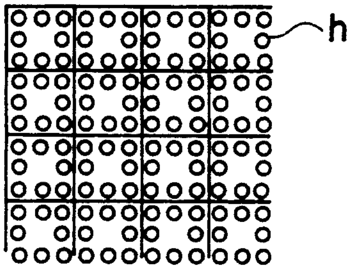
Figure 9C:
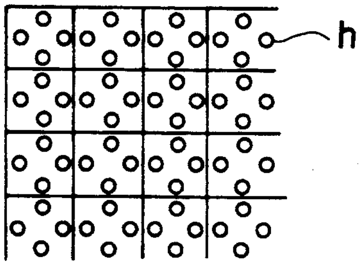
Figure 9D:
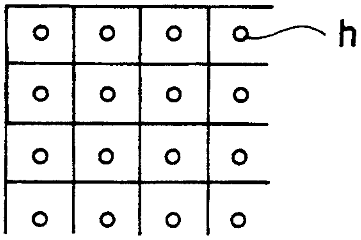

FIG. 6 is a view for illustrating an adding operation for holes in case of making machining data, and FIG. 7 is a view for illustrating a hole deleting operation, wherein (a) denotes an example of deleting one hole and (b) denotes an example of deleting an certain range. FIG. 8 shows an example of a positive and negative reversing operation, wherein (a) denotes a positive punching pattern on the lay-out screen 4a and (b) denotes a negative punching pattern. FIGS. 9(a) to (d) show examples of registration of hole patterns. Reference symbol (h) in each of the figures denotes a punched hole corresponding position.

The machining data made in this way are accompanied with each of identification numbers and registered, thereafter stored in a floppy disk (step S6), called up as required and used and at the same time it is printed out by a printer 8 as required step S7).

The workpiece plate P is punched at the step S8 as shown in FIG. 5(b) in response to the machining data made in this way and then a punched plate is made.

At first, the punches adapted for the machining conditions are installed at the pressing device and at the same time the workpiece plate P is supplied to the feeding spacing 20 (step S8a).

Then, the desired machining data are called up from the floppy disk (step S8b) and the command for starting the punching operation is inputted through the keyboard 5 (step S8c). CPU 2 may output a machining control signal to the machining head control circuit 10 in response to the binary coded machining data inputted to RAM 3 through this operation (step S8*d*).

The machining head control circuit 10 may output a driving signal to the control valves for each of the cylinders 9A and 9B of the pressing head driving device 9 to provide the punchings corresponding to the punching patterns in response to the inputted machining control signal. The cylinders 9A and 9B at the positions corresponding to the punched holes are driven and the pressing heads 36 and 37 are slid in either an advancing or a retracting directions(step S8*e*). After this operation, the upper die plate 26 is pressed (step S8*f*) to perform a punching with the front punches 27 or the rear punches 29 in respect to the workpiece plate P. At this time, the punches 28 may perform the punching in the workpiece plate P every time the upper die plate 26 is pressed (step S8*g*).

Upon completion of one punching operation, the workpiece plate P is fed by one feeding pitch T1 (step S8*h*) by the feeding device 12, and after the feeding counter is stepped (step S8*i*), the workpiece plate P is punched by the operation similar to the above operation. This operation is repeated until the counted value in the feeding counter reaches its final value (step S8*j*). With this operation, the holes H corresponding to the punching pattern are punched in the workpiece plate P so as to make a punched plate.

The present invention is not limited to the aforesaid preferred embodiment, but various modifications can be realized within a scope of the gist of the present invention. For example, the preferred embodiment has employed the pressing head formed with the head surface and the stepped part at its front side and rear side as the linear moving and reciprocating cylinder for the pressing head driving means, and it may also be applicable that an oscillating and rotating oscillation actuator is used in the pressing head driving means and a pressing head formed with the head surface and the stepped parts while its peripheral surface being formed of corrugated one is used at its extreme end.

As described above, according to the present invention, the pressing head is driven in response to the binary coded machining data corresponding to punching pattern, each of the punching punches is controlled individually and the punching is carried out at the workpiece plate, so that a punched plate can be made in a short period of time even in case of applying a new punching pattern as compared to the case in which the rotary pressing roll is used in the prior art and at the same time the punching of a circle, a curved line, a character pattern and a picture pattern or the like can be freely carried out.

Various modifications can be realized in the present invention and the scope of the present invention can be limited only by the description of the claims.

What is claimed is:

1. A punch machining device for a plate, comprising:

a vertically movable upper die including a horizontally arranged punch holder, said punch holder having a large number of punches for punching the plate, said punches having upper and lower ends and vertically slidably extending through the punch holder, a stripper plate vertically movably situated under the punch holder, said stripper palte having holes to allow the punches to pass therethrough and returning means situated between the stripper plate and the punch holder, said returning means urging the stripper plate in a direction away from the punch holder, a lower die situated under the stripper plate to form a passage for the plate to be punched between the lower die and the stripper plate, said lower die having through holes at portions corresponding to the punches to receive the lower ends of the punches when punching operation by moving the upper die together with the stripper plate toward the lower die is carried out so that punch debrises caused by punching operation drop and pass, feeding means for transferring the palte intermittently into the passage between the lower die and the stripper plate in synchronous with the punching operation, pressing heads installed on the punch holder for the respective punches, each pressing head having a head part for immovably holding the punch relative to the punch holder to thereby allow the punch to make ah ole in the plate in the punching operation and a stepped part for allowing the punch to slide upwardly through the punch holder in the punching operation so that the punch does not make a hole, pressing head drivign means attached to the respective pressing heads, each pressing head driving means operating the pressing head to lcoate one of the head part and the stepped part above the upper end of the punch to thereby selectively activate the punch for making a hole in the plate, and a control device including original figure reading means or reading original figure and making image data, editing means for editing the original figure image data outputted from the original figure reading means, and machining data making means for ararnging a hole pattern in respect of the edited image data and making machining data corresponding to a punching pattern, said pressing head driving means being controlled in response to the machining data outputted fromthe machining data making means and being actuated in compliance with the punching pattern so that desired pattern of holes is made in the plate in the punching operation.

2. A punch machining device according to claim 1, wherein said punches are arranged in the punch holder in two rows to cross entire one side of the plate so that two rows of holes are formed at one punching operation.

3. A punch machining device according to claim 2, wherein said upper die further includes a cylinder holder situated above the punch holder, said pressing heads and pressing head driving means being installed in the cylinder holder.

4. A punch machining device according to claim 3, wherein said punch holder further includes middle punches arranged between the two rows of the punches.

* * * * *